United States Patent Office 3,438,850
Patented Apr. 15, 1969

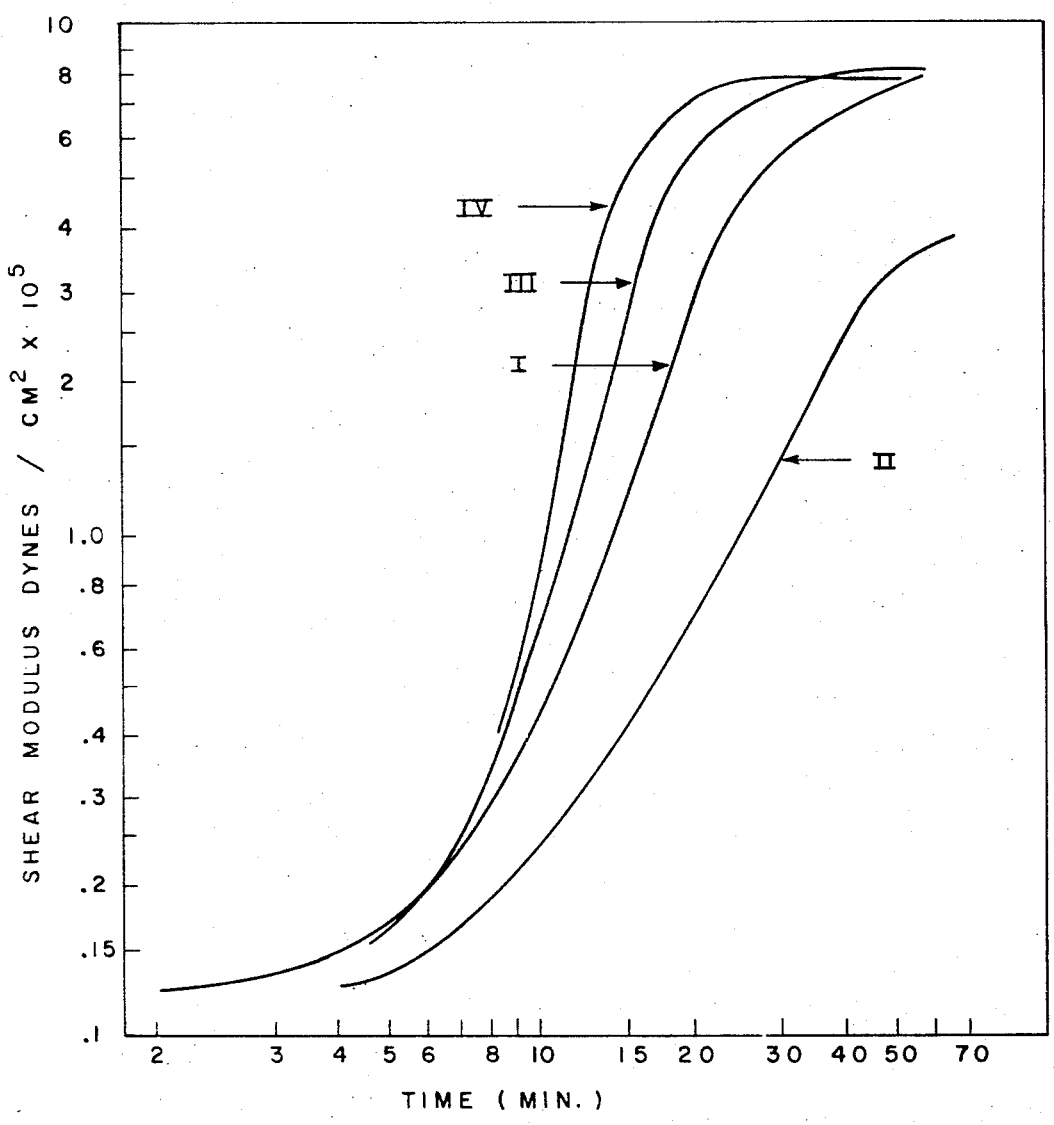

3,438,850
PLIABLE PHENOLIC-TREATED SUBSTRATES
John R. Le Blanc, Wilbraham, and William D. Burke, West Springfield, Mass., assignors to Monsanto Company, St. Louis, Mo., a corporation of Delaware
Filed Dec. 26, 1963, Ser. No. 333,598
Int. Cl. B32b 27/42, 27/10
U.S. Cl. 161—232
3 Claims

ABSTRACT OF THE DISCLOSURE

This disclosure pertains to flexible fibrous substrates, particularly paper substrates. Improved flexibility is obtained by impregnating a fibrous substrate with a phenol-formaldehyde resin having dissolved therein a particular amine terminated polyester or a particular methylolated amine terminated polyester.

This invention relates to a fibrous substrate treated with a thermosetting resin composition and more particularly to a flexible paper treated with a composition containing a phenol-formaldehyde resin and a particular amine terminated polyester wherein the thermosetting resin has been advanced to the infusible state.

It is notoriously well-known that when phenol-formaldehyde resins are advanced or cured to an infusible state, the resins are very brittle. When used to impregnate fillers such as paper, the impregnated materials are also very brittle and will crack or break upon bending. To relieve the brittle characteristics of a phenol-formaldehyde resin, certain additives have been incorporated therein in order to impart flexibility to the cured or infusible phenolic resin. In general these additives are of the thermoplastic type of materials and have included such compounds as polyvinyl butyral, polyvinyl alcohol, plasticizers of the polymeric and nonpolymeric type such as phthalate esters, phosphate esters, polyesters, etc., which compositions are generally physical mixtures of the component parts. Unfortunately, these additives have certain serious drawbacks in that in order to obtain any degree of flexibility in the cured resin so as to impart flexibility to the treated fibrous material, large amounts of the additive had to be used which resulted in a deficiency of the other desirable properties of the phenol-formaldehyde resin such as its bonding strength, water absorption, etc. In addition, these additives are rarely soluble in or compatible with the cured resin and thus the additive would exude out from the cured phenolic. This would then cause a decrease in the effectiveness of the additive to impart flexibility to the cured phenol-formaldehyde resin. Therefore, it has been discovered that by treating a fibrous material with a particular compound having dissolved therein a particular flexibilizing compound, the treated fibrous materials had excellent flexibility.

Therefore, it is a object of this invention to provide a fibrous substrate treated with a thermosetting resin.

Another object of this invention is to provide a flexible fibrous substrate treated with a thermosetting resin which has been advanced to the infusible state.

Other objects of this invention will in part be obvious and will in part be set out and appear hereinafter.

Briefly, these and other objects of this invention are attained by treating a fibrous substrate with a particular thermosetting resin composition consisting of a phenol-formaldehyde condensation reaction product and a particular polyester which is soluble therein.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

EXAMPLE I

A phenol-formaldehyde resin is prepared by reacting under reflux conditions 100 parts of phenol, 92.5 parts of a 50% formalin solution, 0.86 part of flake caustic, 36 parts of alcohol and 3 parts of water. The resulting resin is a 65% solids having a pH of about 8.0.

To 9 parts of the above resin system on a solids basis, 1 part of an amine terminated polyester is added. The amine terminated polyester employed herein is prepared by reacting ethylene glycol and adipic acid under reflux conditions. The reaction product so obtained is then reacted with ethylene diamine in a ratio of one mol of ethylene diamine per each carboxyl group of the reaction product of ethylene glycol and adipic acid. The reaction is carried out under reflux conditions. The resulting product is an amine terminated polyester. The amine terminated polyester is soluble in the phenol-formaldehyde resin.

This resin is designated as I.

EXAMPLE II

Example I is repeated except that to 8 parts of the phenol-formaldehyde resin, 2 parts of the amine terminated polyester is added.

This resin is designated as II.

EXAMPLE III

Example I is repeated except that to 9.5 parts of the phenol-formaldehyde resin, 0.5 part of the amine terminated polyester is added.

This resin is designated as III.

EXAMPLE IV

With the resin solution prepared in Examples I, II and III, kraft paper is immersed therein. The treated paper samples are then exposed to 135° C. for 30 minutes in order to advance the resin to an infusible state. The treated paper samples are then weighed and are found to have a resin pickup of about 30 weight percent each based on the weight of the untreated paper.

EXAMPLE V

The treated samples of Example IV are cut in strips 3" x ½". The shear modulus of the samples is then determined using a torsion pedulum and at a temperature of 157° C. At various time intervals, the sample is turned ½ turn and allowed to equilibrate to its original position. The amplitude of the oscillation is recorded and from this, the shear modulus is calculated using the formula of page 141 of Lawrence E. Nielsen's publication Mechanical Properties of Polymers, chapter VII, Dynamic Mechanical Testing.

As a control, a straight unmodified phenol-formaldehyde resin as prepared in Example I is used as a control and is designated as IV.

The results of the samples are plotted on a logarithmic graph as shear modulus in dynes per square centimeter vs. time in minutes and are shown in the figure. The more flexible the material, the more gradual is the slope of the curve which in turn means that the sample is more pliable. The curves are designated as I, II, III and IV corresponding to the resin samples employed herein. As shown by the curves, sample IV which is the paper sample treated with the unmodified phenol-formaldehyde resin has little or no flexibility.

This invention is directed to a flexible fibrous substrate impregnated with a thermosettable resin. The thermosettable resin composition consists of a phenol-formaldehyde reaction product having dissolved therein a particular polyester compound. The polyester employed herein is selected from the group consisting of amine terminated polyesters and methylolated amine terminated polyesters and mixtures thereof.

The amine terminated polyester employed in this invention is one prepared by reacting a polyol with either a polybasic acid or an anhydride to form an intermediate product which intermediate product is then reacted with a particular polyamine. The particular polyamine employed herein is one containing at least two amine groups wherein one of the amine groups is a primary amine. The product thus formed from this reaction is an amine terminated polyester which material is a waxy solid at room temperature and is cream colored in appearance. It has a melting point of about 60° C. and is readily soluble in a phenol-formaldehyde resin while insoluble in water and alcohol. The odd feature of this amine terminated polyester is that while it is insoluble in water and alcohol separately, it is, however, soluble in a mixture of alcohol and water.

The amine terminated polyester compound of this invention can be best described by the following formula:

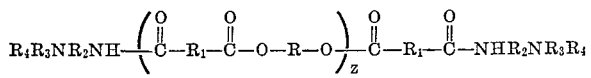

wherein R is selected from the group consisting of an aliphatic hydrocarbon of 2–18 carbon atoms, an aromatic hydrocarbon of 1 benzene ring and an alicyclic hydrocarbon of 2–18 carbon atoms; $R_1$ is selected from the group consisting of an aliphatic hydrocarbon of 2–38 carbon atoms, an aromatic hydrocarbon of 1 benzene ring and an alicyclic hydrocarbon of 2–38 carbon atoms; $R_2$ is an aliphatic hydrocarbon of 2–12 carbon atoms; $R_3$ is independently selected from the group consisting of hydrogen, an aliphatic hydrocarbon of 1–12 carbon atoms and polyethylene amines of 1–10 units; $R_4$ is independently selected from the group consisting of hydrogen and an aliphatic hydrocarbon of 1–12 carbon atoms; and Z is an integer of from 1–200. In the practice of this invention, the preferred amine terminated polyester is one wherein $R_4$ is hydrogen, Z is 1–50.

More particularly, the preferred amine terminated polyester of this invention is that described by the above formula and wherein R and $R_2$ are aliphatic hydrocarbons of 2–6 carbon atoms, $R_1$ is an aliphatic hydrocarbon of 4–10 carbon atoms, $R_3$ and $R_4$ are hydrogen and Z is 1. Specifically, the preferred amine terminated polyester compound of this invention is that described by the above formula wherein R and $R_2$ are ethylene, $R_1$ is butylene, $R_3$ and $R_4$ are hydrogen and Z is 1.

The polyols that can be used in the practice of this invention are pentaerithrytol, hexylene glycol, butylene glycol, 1,2-propylene glycol and 1,12-dodecyl glycol.

The polybasic acids or anhydrides that can be used in the practice of this invention are either the aliphatic di- or tri- basic acids or anhydrides of 4–40 carbon atoms, aromatic di- or tri- basic acids or anhydrides of 1 benzene ring or alicyclic di- or tri- basic acids or anhydrides of 4–40 carbon atoms. Some of the polybasic acids and anhydrides which can be employed in the practice of this invention and which can be used in place of the polybasic acids and anhydrides used in the examples are maleic acid, maleic anhydride, succinic acid, succinic anhydride, isophthalic acid, phthalic acid, phthalic anhydride, citraconic acid, citraconic anhydride, glutaric acid, glutaric anhydride, sebacic acid, terphthalic acid and dimerized fatty acids. The mol ratio to be employed when reacting the polybasic acid or anhydride can range from 1–4 mols thereof per mol of the polyol. However, it should be noted that there should at least be a slight excess of the polybasic acid or anhydride. For example, when employing a triol such as glycerol, at least 1½–2 mols of at least a dibasic acid should be reacted therewith.

The methylolated amine terminated polyester employed herein is prepared by reacting the amine terminated polyester with formaldehyde to form the methylolated polyester. This material so formed is readily soluble in water while insoluble in the phenol-formaldehyde resin. The methylolated amine terminated polyester corresponds to the following formula:

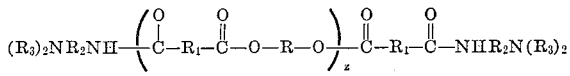

wherein R is selected from the group consisting of an aliphatic hydrocarbon of 2–18 carbon atoms, an aromatic hydrocarbon of 1 benzene ring and an alicyclic hydrocarbon of 2–18 carbon atoms; $R_1$ is selected from the group consisting of an aliphatic hydrocarbon of 2–38 carbon atoms, an aromatic hydrocarbon of 1 benzene ring and an alicyclic hydrocarbon of 2–38 carbon atoms; $R_2$ is an aliphatic hydrocarbon of 2–12 carbon atoms; $R_3$ is independently selected from the group consisting of hydrogen and a methylol group —$CH_2OH$ providing that at least two $R_3$ groups are methylol groups; and Z is an integer of from 1–200. More particularly, the preferred methylolated amine terminated polyester of this invention is that described by Formula II wherein R and $R_2$ are aliphatic hydrocarbons of 2–6 carbon atoms, $R_1$ is an aliphatic hydrocarbon of 4–10 carbon atoms and $R_3$ is as previously defined therefor. Specifically, the preferred methylolated amine terminated polyester compound of this invention is that described by Formula II wherein R and $R_2$ are ethylene, $R_1$ is butylene and $R_3$ is a methylol group —$CH_2OH$—.

The phenol-aldehyde resins employed herein may be of any of the known phenol-aldehyde resins. However, particularly useful are the phenol-formaldehyde resins which are prepared by the reaction of 0.5–3.5 mols of formaldehyde per mol of phenol. The amine terminated polyester may be added to the kettle when manufacturing the phenol-formaldehyde, preferably at the end of the reaction thereof or it may be added prior to shipping or prior to using the phenol-formaldehyde resin. Since phenol-formaldehyde resins prepared by reacting less than 1 mol of formaldehyde such as 0.50–0.95 mol thereof per mol of phenol are novolacs, it is preferred to add the amine terminated polyester to the kettle during preparation thereof. Such novolacs can be prepared in either solid form or they can be recovered in an organic solvent. In either case when using the resin, a cross-linking agent is generally added such as hexamethylene tetramine. Phenol-formaldehyde resins prepared by reacting more than 1 mol of formaldehyde such as 1.0–3.5 mols thereof per mol of phenol may be recovered either in water or in an organic solvent. With either type of phenol-formaldehyde resin, the amine terminated polyester of this invention is soluble in the phenol-formaldehyde resin, which resin composition is flexible when advanced to the infusible state.

The resin composition of this invention comprises a phenol-formaldehyde resin having dissolved therein an amine terminated polyester or a methylolated amine terminated polyester. The amount of the amine terminated polyester which can be dissolved in the phenol-formaldehyde resin can vary between very wide limits depending upon the degree of flexibility desired and the end-use application of the phenol-formaldehyde resin. Preferably, the amount to be dissolved therein can vary from 99.5–10 weight percent of the phenol-formaldehyde resin and, correspondingly, 0.5–90 weight percent of the amine terminated polyester. More particularly, the composition can consist of 95–60 weight percent of the phenol-formaldehyde resin and, correspondingly, 5–40 weight percent of the amine terminated polyester resin of this invention. When dissolving the amine terminated polyester in the phenol-formaldehyde resin, the resin composition will comprise either (1) a solution of the amine terminated polyester in the phenol-formaldehyde resin, or (2) a solution of the reaction product of the phenol-formaldehyde resin and the amine terminated polyester or (3) a solution of both (1) and (2).

When employing the resin composition of this invention to treat fibrous substrates, the treated fibrous substrate material has excellent flexibility as shown in FIG. I in comparison to a fibrous substrate treated with an unmodified phenol-formaldehyde resin. Depending upon the type of phenol-formaldehyde resin to be employed herein either the amine terminated polyester or the methylolated amine terminated polyester or a mixture of both may be used successfully when fully recognizing the solubility characteristics of each. The fibrous substrates treated with the resin compositions set forth herein form excellent core stock material for post-formable laminates. In addition such treated fibrous substrates can be suitable for preparing cold punch or hot punch industrial grade laminates used for printed circuits. In general, any fibrous substrate may be treated with the resin composition herein wherein flexibility is desired while still requiring the high bonding strength and high structural strength of a phenol-formaldehyde resin.

It will thus be seen that the objects set forth above, among those made apparent from the preceding description, are efficiently attained and since certain changes may be made in carrying out the above process or method without departing from the scope of the invention, it is intended that all matter contained in the above description shall be interpreted as illustrative and not in a limiting sense.

What is claimed is:
1. A post-formable decorative laminate comprising an overlay sheet, a decorative print sheet and suitable core stock paper impregnated with a thermosettable resin composition comprising a phenol-formaldehyde condensation reaction product of 0.5–3.5 mols of formaldehyde per mol of phenol and a methylolated amine terminated polyesters, wherein said resin composition has been cured to an infusible state.

2. A fibrous substrate impregnated with an aqueous phenol-formaldehyde condensation reaction product of 0.5–3.5 mols of formaldehyde per mol of phenol having dissolved therein a water soluble methylolated amine terminated polyester corresponding to the following formula

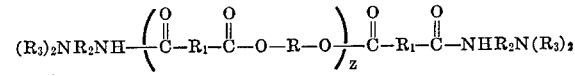

wherein R is selected from the group consisting of an aliphatic hydrocarbon of 2–18 carbon atoms, an aromatic hydrocarbon of one benzene ring and an alicyclic hydrocarbon of 2–18 carbon atoms; $R_1$ is selected from the group consisting of an aliphatic hydrocarbon of 2–38 carbon atoms, an aromatic hydrocarbon of one benzene ring and an alicyclic hydrocarbon of 2–38 carbon atoms; $R_2$ is an aliphatic hydrocarbon of 2–12 carbon atoms; $R_3$ is a member selected from the group consisting of hydrogen and a methylol group ($-CH_2OH$) wherein at least two $R_3$ groups are methylol groups, and Z is an integer of from 1–200; wherein said reaction product has been advanced to an infusible state.

3. The substrate of claim 2 wherein the fibrous substrate is paper.

References Cited
UNITED STATES PATENTS

| | | | |
|---|---|---|---|
| 2,681,894 | 6/1954 | Hoenel | 260—842 |
| 2,898,313 | 8/1959 | Ericks | 260—843 |
| 2,382,238 | 8/1945 | Laufenberg et al. | 260—14 |
| 2,576,045 | 11/1951 | Robinson et al. | 260—75 |
| 2,801,198 | 7/1957 | Morris et al. | 161—246 |

EARL M. BERGERT, *Primary Examiner.*

W. E. HOAG, *Assistant Examiner.*

U.S. Cl. X.R.

156—331, 332, 335; 161—259, 233, 413